US012304582B2

(12) United States Patent
Fujimoto et al.

(10) Patent No.: US 12,304,582 B2
(45) Date of Patent: May 20, 2025

(54) SADDLE-RIDE VEHICLE

(71) Applicant: HONDA MOTOR CO., LTD., Tokyo (JP)

(72) Inventors: Ryoji Fujimoto, Tokyo (JP); Masayuki Hiramaru, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 396 days.

(21) Appl. No.: 17/951,444

(22) Filed: Sep. 23, 2022

(65) Prior Publication Data
US 2023/0102132 A1   Mar. 30, 2023

(30) Foreign Application Priority Data

Sep. 30, 2021  (JP) ................ 2021-162135

(51) Int. Cl.
*B62J 41/00* (2020.01)
*B60K 11/04* (2006.01)

(52) U.S. Cl.
CPC .......... *B62J 41/00* (2020.02); *B60K 11/04* (2013.01)

(58) Field of Classification Search
CPC .............................. B62J 41/00; B60K 11/04
USPC ....................................................... 180/229
See application file for complete search history.

(56) References Cited

U.S. PATENT DOCUMENTS

| 2003/0066697 A1 | 4/2003 | Kodan et al. |
| 2007/0007065 A1* | 1/2007 | Iizuka .............. B62K 25/28 |
| | | 180/227 |
| 2009/0095553 A1* | 4/2009 | Iwanaga ............ B60K 11/04 |
| | | 180/68.4 |

FOREIGN PATENT DOCUMENTS

| JP | S62-66898 U  | 4/1987 |
| JP | S63-315385 A | 12/1988 |
| JP | 2003-89380 A | 3/2003 |
| JP | 2006-176030 A | 7/2006 |

OTHER PUBLICATIONS

Japanese Office Action dated Jul. 4, 2023 issued in corresponding Japanese application No. 2021-162135 A; English machine translation included (7 pages).
German Office Action dated Dec. 28, 2023, German Application No. 10 2022 124 6124, English translation included, 9 pages.
German Office Action dated Oct. 28, 2023, German Application No. 10 2022 124 6124, English translation included, 9 pages.

* cited by examiner

*Primary Examiner* — Lindsay M Low
*Assistant Examiner* — Omar Morales
(74) *Attorney, Agent, or Firm* — Rankin, Hill & Clark LLP (57) ABSTRACT

A saddle-ride vehicle includes: a head pipe; a frame extending rearward from the head pipe; a down frame extending downward from the head pipe or a front end portion of the frame; an engine and a radiator supported by the down frame; and an engine hanger that is attached to the down frame and supports the engine, and the engine hanger integrally includes a radiator support portion that supports the radiator.

4 Claims, 7 Drawing Sheets

SADDLE-RIDE VEHICLE

INCORPORATION BY REFERENCE

The present application claims priority under 35 U.S.C. § 119 to Japanese Patent Application No. 2021-162135 filed on Sep. 30, 2021. The content of the application is incorporated herein by reference in its entirety.

BACKGROUND OF THE INVENTION

Field of the Invention

The present invention relates to a saddle-ride vehicle.

Description of the Related Art

There has been known a saddle-ride vehicle in which an engine is supported by an engine hanger attached to lower ends of down frames extending downward from a head pipe, and a radiator is supported by a bracket attached to intermediate portions in the up-down direction of the down frames (for example, see Japanese Patent Laid-Open No. 2006-176030).

SUMMARY OF THE INVENTION

However, in the case in which an engine support portion and a radiator support portion are independently attached to the down frames as in the conventional saddle-ride vehicle described above, the number of parts is large, and the structure is complicated.

The present invention has been made in light of the above situation, and an object thereof is to provide a simple structure to fix the engine and the radiator to the down frames.

A saddle-ride vehicle includes: a head pipe; a frame extending rearward from the head pipe; a down frame extending downward from the head pipe or a front end portion of the frame; an engine and a radiator supported by the down frame; and an engine hanger that is attached to the down frame and supports the engine, and the engine hanger integrally includes a radiator support portion that supports the radiator.

It is possible to fix an engine and a radiator to a down frame with a simple structure having fewer parts.

DETAILED DESCRIPTION OF THE PREFERRED EMBODIMENT

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

EMBODIMENT

Figure 1:
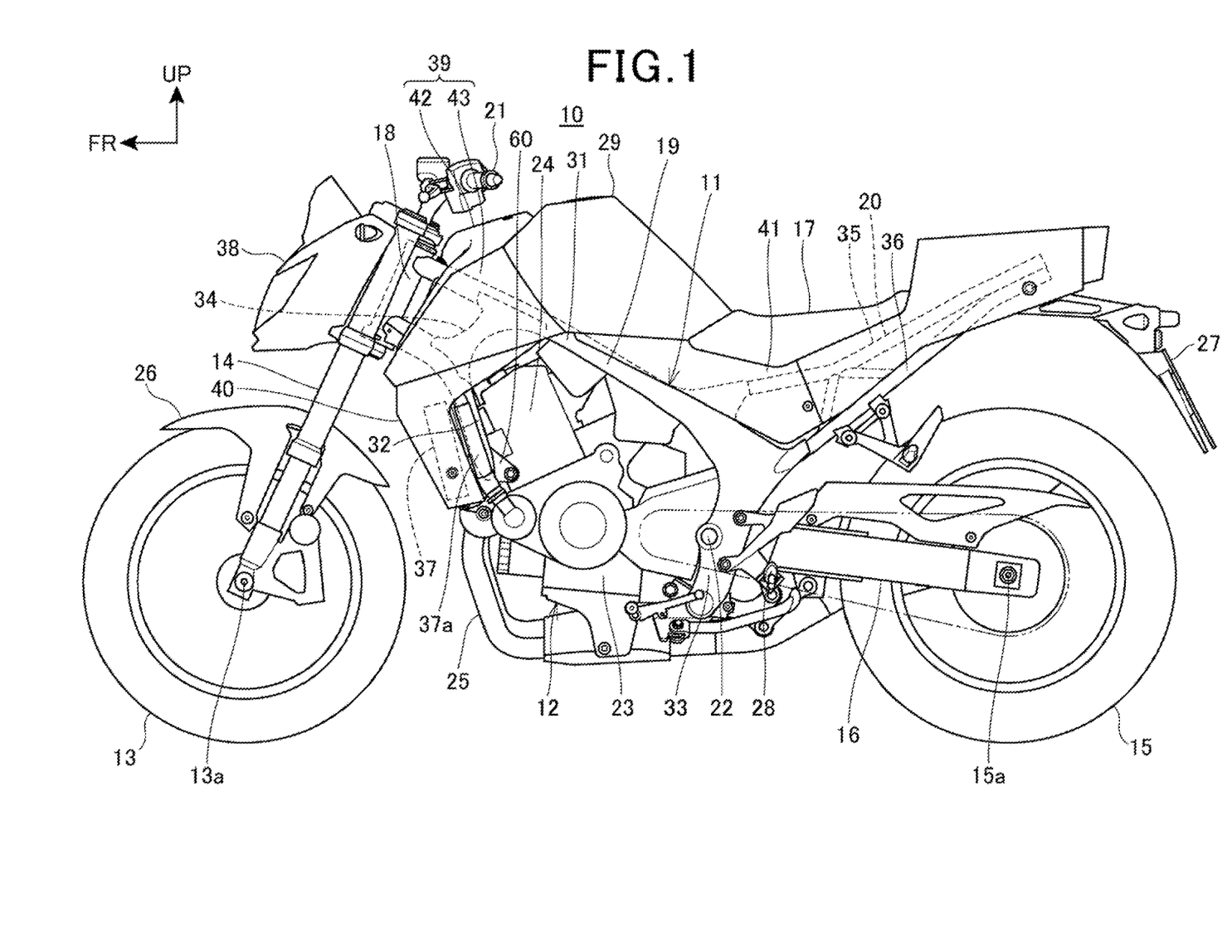
FIG. 1 is a side view of a saddle-ride vehicle according to an embodiment of the present invention.

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

The front frame 19 includes a pair of right and left main frames 31 (frames) extending rearward and downward from an upper portion of the head pipe 18, a pair of right and left down frames 32 extending rearward and downward from a lower portion of the head pipe 18, a pair of right and left pivot frames 33 extending downward from rear end portions of the main frames 31, and gussets 34 located on the rear side of the head pipe 18 and connecting the down frames 32 and the main frames 31.

The rear frame 20 includes a pair of right and left seat frames 35 extending rearward and upward from rear end portions of the main frames 31, and a pair of right and left sub-frames 36 extending rearward and upward from upper end portions of the pivot frames 33 and connected to rear end portions of the seat frames 35.

The power unit 12 is located below the main frames 31 and between the down frames 32 and the pivot frames 33 and supported by the front frame 19.

The power unit 12 is an engine. The cylinder 24 extends upward from the upper face of a front portion of the crank case 23. The cylinder 24 includes a cylinder block 24a that houses the foregoing piston, a cylinder head 24b joined to the upper face of the cylinder block 24a, and a head cover 24c.

The fuel tank 29 is located above the main frames 31 and between the seat 17 and the head pipe 18 in the vehicle front-rear direction. The fuel tank 29 is supported by the main frames 31.

A radiator 37 through which the cooling water for the power unit 12 passes is located on the front side of the cylinder 24 and the down frames 32. The radiator 37 has a plate shape and is oriented such that the thickness direction thereof is along the vehicle front-rear direction. The radiator 37 makes the cooling water dissipate its heat by the air passing through the radiator 37 in the front-rear direction.

The saddle-ride vehicle 10 includes, as vehicle body covers that covers the vehicle body such as the vehicle body frame 11, a front cover 38 that covers the head pipe 18 from the front side, a tank cover 39 that covers the fuel tank 29 from the front side, a pair of right and left radiator shrouds 40 that cover the radiator 37 from the outsides in the vehicle width direction, and a pair of right and left side covers 41 that cover part of the vehicle body below the seat 17 from the outsides in the vehicle width direction.

The tank cover 39 includes a first tank cover 42 that covers the fuel tank 29 from the front side and a pair of right and left second tank covers 43 provided on the rear side of the first tank cover 42 and on the front side of the fuel tank 29.

The radiator 37 is located below the tank cover 39.

The radiator 37 is connected to the crankcase 23 with a radiator hose 37a extending downward from an upper portion of the radiator 37.

Figure 2:
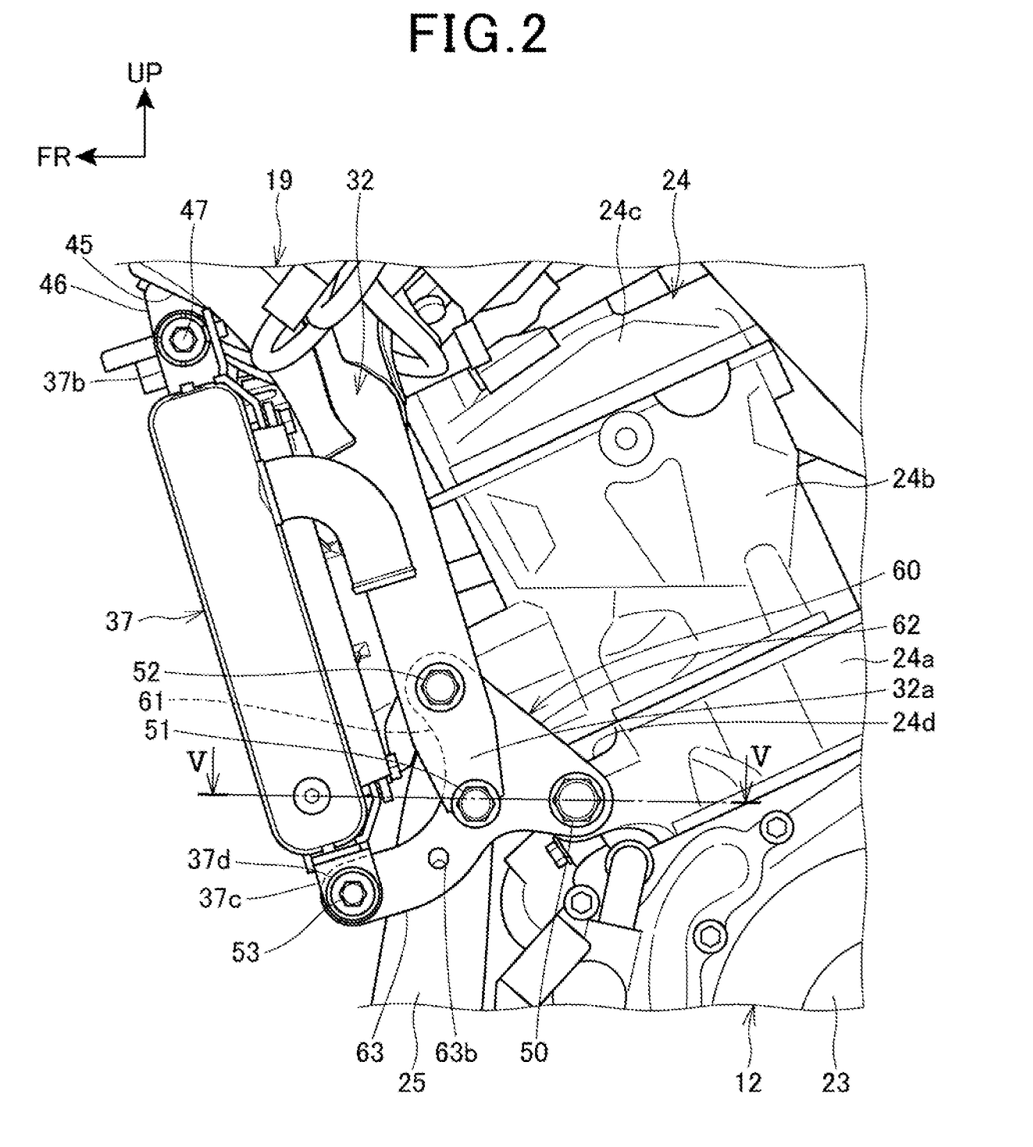
FIG. 2 is a left side view of the support structure for a radiator and a power unit.
Figure 3:
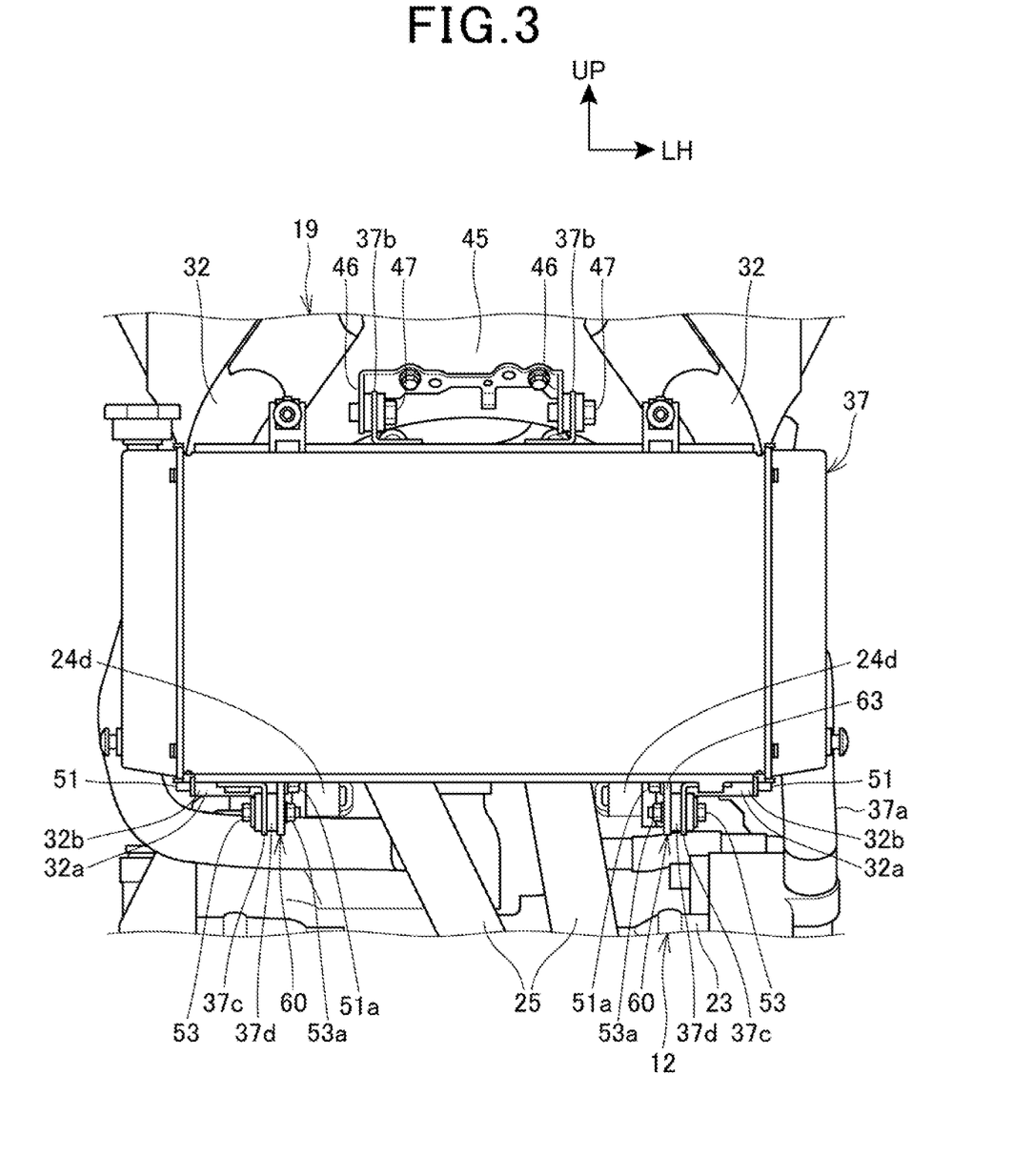
FIG. 3 is a front view of the radiator, the power unit, and front frames.

FIG. 2 is a left side view of the support structure for the radiator 37 and the power unit 12. FIG. 3 is a front view of the radiator 37, the power unit 12, and the front frame 19. In FIG. 2, the radiator shrouds 40 and the radiator hose 37a are not illustrated. In FIG. 3, the radiator shrouds 40 are not illustrated.

With reference to FIGS. 2 and 3, the radiator 37 is located on the front side of the down frames 32. The radiator 37 is slightly inclined to the front so as to be along the down frames 32. The radiator 37 extends in the vehicle width direction on the right and left sides of the front wheel 13 in front view.

The front frame 19 includes a plate-shaped front gusset 45 that connects the front faces of upper end portions of the right and left down frames 32 in the vehicle width direction (right-left direction).

The front gusset 45 is provided with a pair of right and left radiator stays 46 that support upper end portions of the radiator 37. The radiator stays 46 have plate shapes extending frontward and downward from the front face of the front gusset 45.

The upper face of the radiator 37 is provided with a pair of right and left plate-shaped upper attachment portions 37b extending upward. The upper end portion of the radiator 37 is fasten to the radiator stays 46 by upper radiator fasteners 47 inserted in the respective upper attachment portions 37b in the vehicle width direction.

The lower face of the radiator 37 is provided with a pair of right and left plate-shaped lower attachment portions 37c extending downward.

Figure 4:
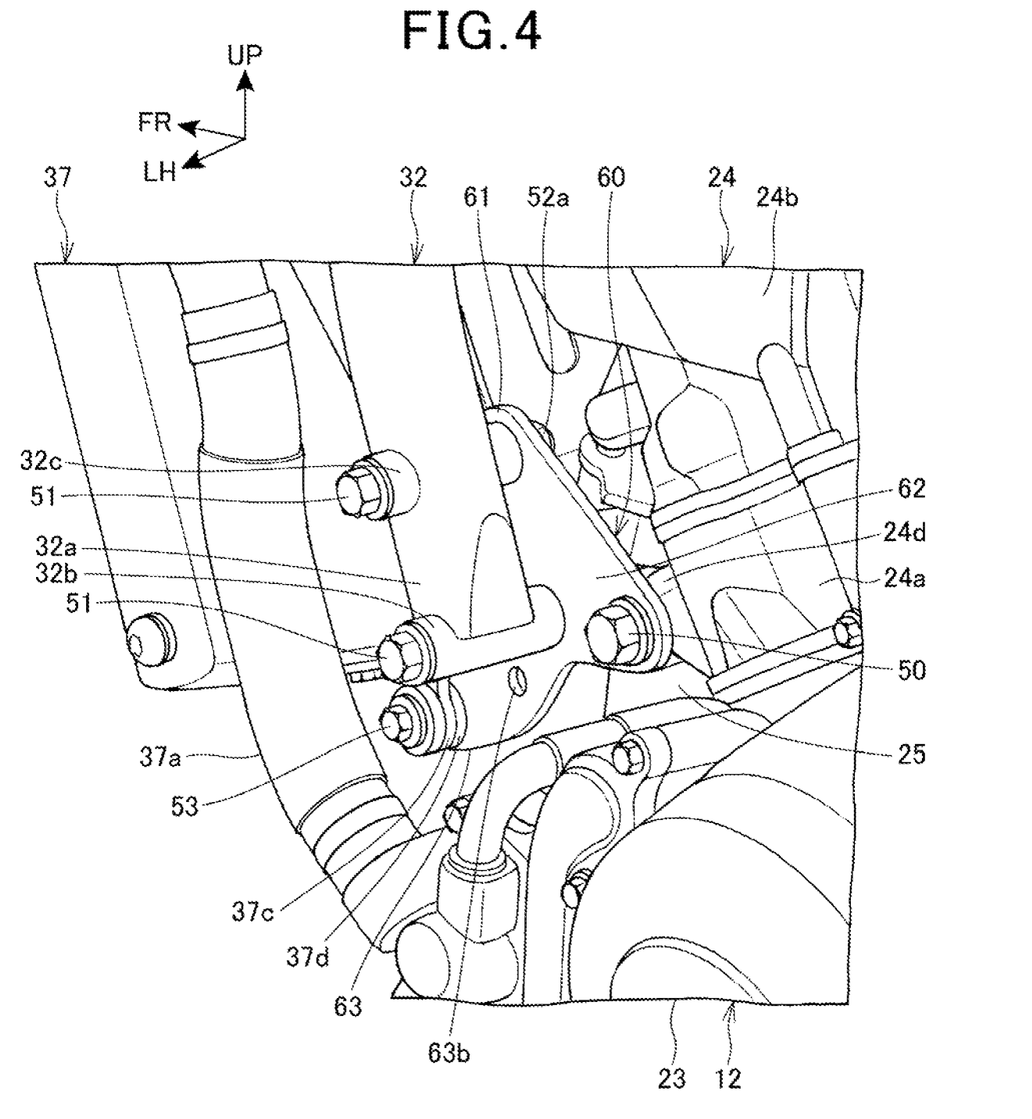
FIG. 4 a perspective view of the support structure for the radiator and the power unit from a rear side.
Figure 5:
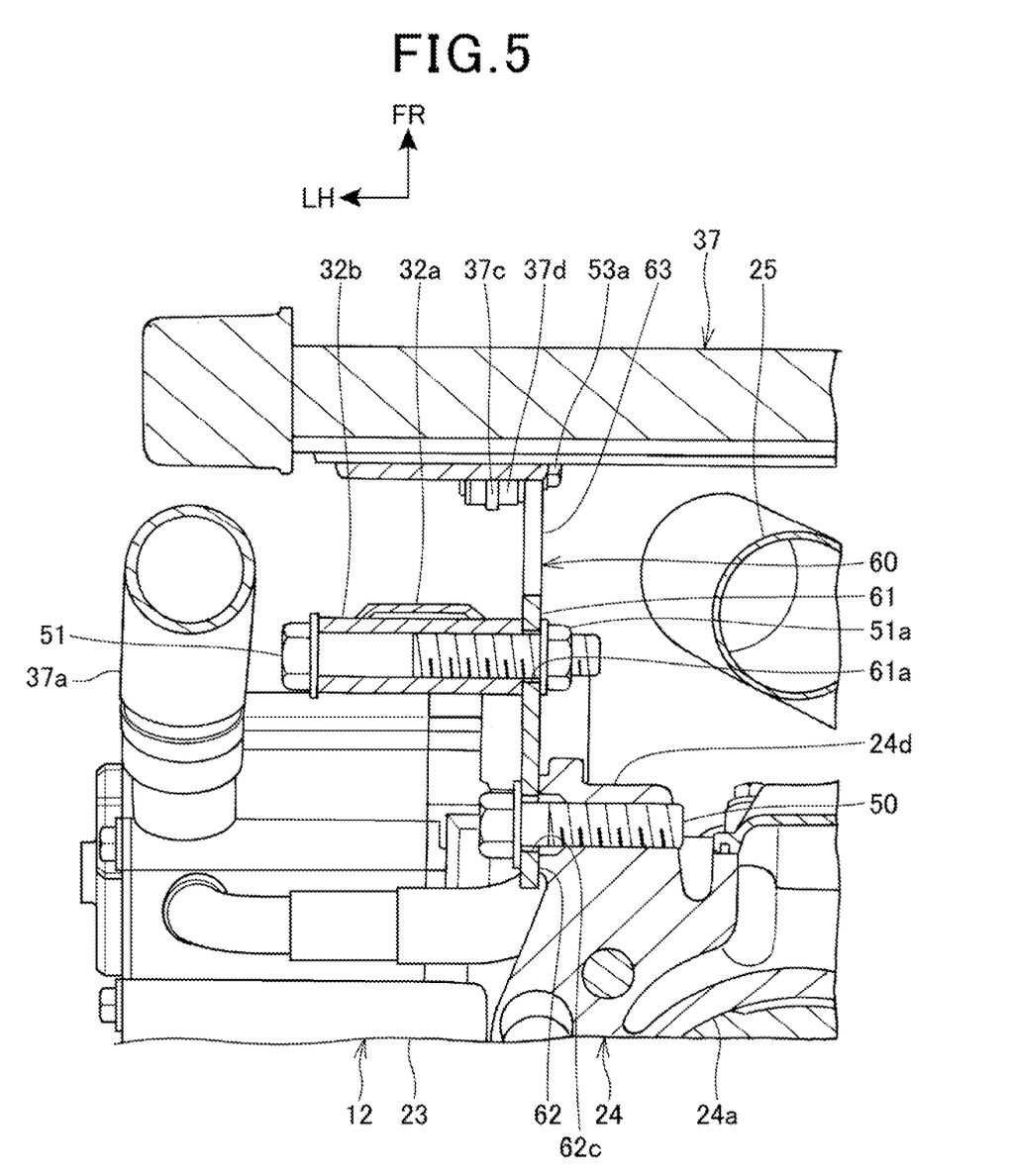
FIG. 5 is a cross-sectional view taken along V-V in FIG. 2.

FIG. 4 is a perspective view of the support structure for the radiator 37 and the power unit 12 from a rear side. FIG. 5 is a cross-sectional view taken along line V-V in FIG. 2.

With reference to FIGS. 2 to 5, the radiator 37 and the power unit 12 are supported by the down frames 32 via engine hangers 60 attached to the down frames 32. The engine hangers 60 are attached to the respective right and left down frames 32. The right and left engine hangers 60 and the right and left down frames 32 are approximately symmetrical on the right and left sides, and hence, the following will be described with reference to the left support structure.

Note that the power unit 12 is fixed to the front frame 19 and other frames also at a plurality of fixing points other than the engine hanger 60. For example, a rear portion of the power unit 12 is fixed to the pivot frame 33.

The power unit 12 is located on the rear side of the down frame 32. Specifically, the crankcase 23 is located on the lower rear side of a lower end portion 32a of the down frame 32. The cylinder 24 is located on the rear side of the down frame 32 and extends forward and upward along the down frame 32. The cylinder block 24a is located at the same height position as the lower end portion 32a of the down frame 32.

The cylinder block 24a has a fixing hole portion 24d at an end portion outside in the vehicle width direction of its front end portion. The fixing hole portion 24d has a hole extending in the vehicle width direction, and the inner periphery of this hole has a female thread.

The fixing hole portion 24d receives an engine fastener 50 for fastening the engine hanger 60 to the cylinder block 24a from the outside in the vehicle width direction. The engine fastener 50 is a bolt.

The down frame 32 is a pipe member extending in an up-down direction.

The engine hanger 60 is a separate part from the down frame 32. The engine hanger 60 is fastened to the lower end portion 32a of the down frame 32 by a first fastener 51 (fastener) and a second fastener 52 (fastener). The first fastener 51 and the second fastener 52 are a plurality of bolts.

The lower end portion 32a of the down frame 32 has a first fixing portion 32b and second fixing portion 32c to which the engine hanger 60 is fixed.

The first fixing portion 32b and the second fixing portion 32c are tubular members extending in the vehicle width direction. The first fixing portion 32b and the second fixing portion 32c pass through the down frame 32 in the vehicle width direction. Both end portions of the first fixing portion 32b and second fixing portion 32c in the vehicle width direction protrude in the vehicle with direction from the down frame 32.

The first fixing portion 32b is provided at the lower end of the down frame 32. The second fixing portion 32c is provided on the front upper side of the first fixing portion 32b in the lower end portion 32a.

The first fastener 51 is inserted into the tube of the first fixing portion 32b from the outside in the vehicle width direction. A first nut 51a is fastened to the distal end of the first fastener 51 protruding inward in the vehicle width direction from the first fixing portion 32b.

The second fastener 52 is inserted into the tube in the second fixing portion 32c from the outside in the vehicle width direction. A second nut 52a is fastened to the distal end of the second fastener 52 protruding inward in the vehicle width direction from the second fixing portion 32c.

The lower attachment portion 37c of the radiator 37 is fastened to the engine hanger 60 by a radiator fastener 53 that is inserted into the lower attachment portion 37c from the outside in the vehicle width direction. The radiator fastener 53 is a bolt. A tubular anti-vibration member 37d is attached to the lower attachment portion 37c. The radiator fastener 53 is inserted into the anti-vibration member 37d and the lower attachment portion 37c. The anti-vibration member 37d is sandwiched between the lower attachment portion 37c and the engine hanger 60. A nut 53a is fastened to the distal end of the radiator fastener 53.

Figure 6:
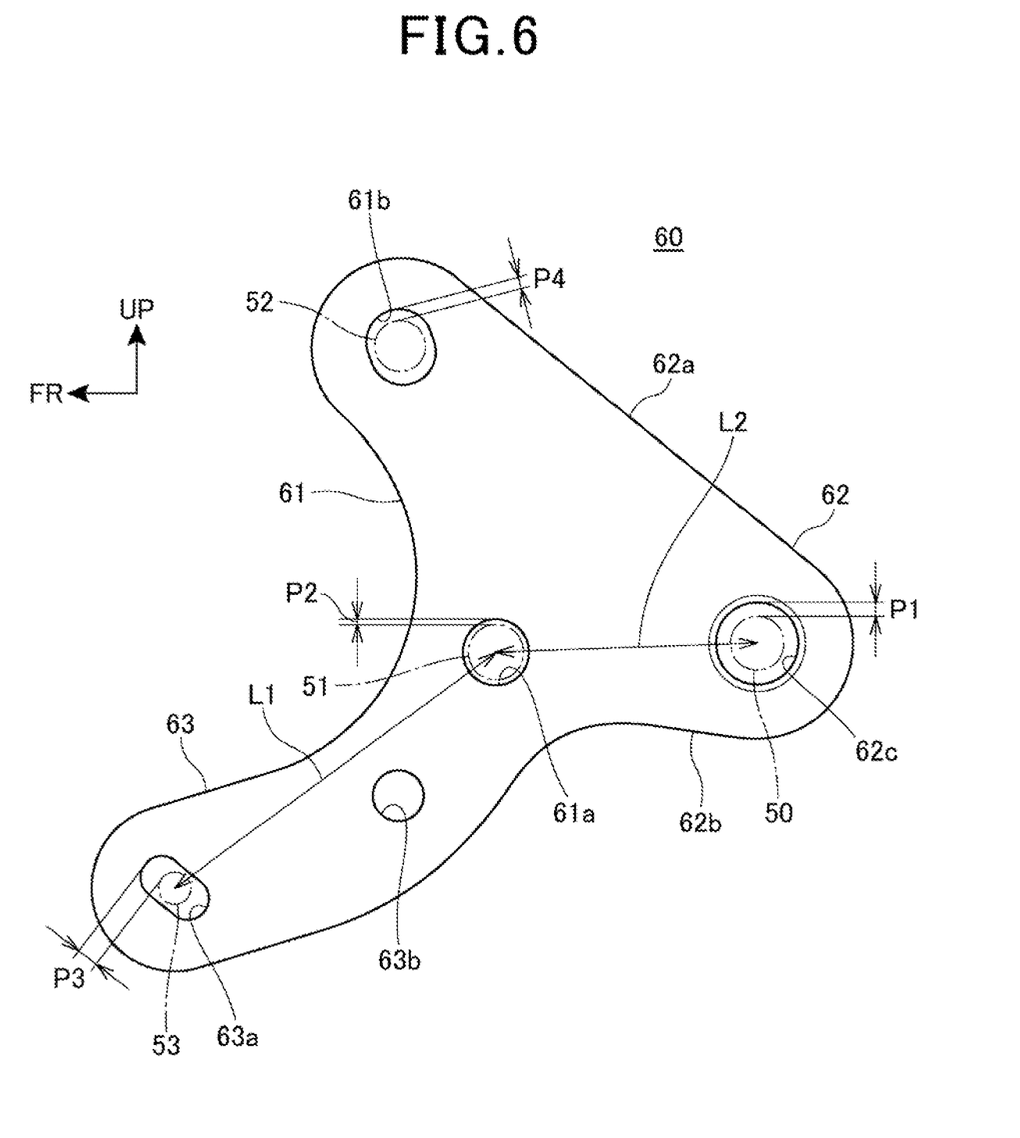
FIG. 6 is a left side view of an engine hanger.

FIG. 6 is a left side view of the engine hanger 60.

With reference to FIGS. 2 to 6, the engine hanger 60 is connected to the cylinder block 24a of the power unit 12 on the rear side of the down frame 32 and connected to the radiator 37 on the front side of the down frame 32.

The engine hanger 60 is a plate-shaped member with the thickness direction oriented along the vehicle width direction.

The engine hanger 60 is fixed to the inside face in the vehicle width direction of the down frame 32.

Specifically, the engine hanger 60 has a unitary structure including a base portion 61 that is fixed to the down frame 32 by the first fastener 51 and the second fastener 52, an engine support portion 62 that extends rearward from the base portion 61 and is connected to the cylinder block 24a, and a radiator support portion 63 that extends forward from the base portion 61 and is connected to the radiator 37.

The base portion 61 has a plate shape elongated in an up-down direction along the lower end portion 32a of the down frame 32. Because the base portion 61 is attached to the inside face in vehicle width direction of the lower end portion 32a, most part of the base portion 61 is hidden by the lower end portion 32a in vehicle side view.

The base portion 61 has a fixing hole 61a that is fastened to the down frame 32 by the first fastener 51 and an upper fixing hole 61b that is fastened to the down frame 32 by the second fastener 52.

The fixing hole 61a is provided at a lower portion of the base portion 61. The upper fixing hole 61b is provided at an upper portion of the base portion 61 and located on the front upper side of the fixing hole 61a.

The fixing hole 61a is a circular hole. The upper fixing hole 61b is a slotted hole elongated in an up-down direction. The lengths of the fixing hole 61a and the upper fixing hole 61b in the front-rear direction are the same, but the length in the up-down direction of the upper fixing hole 61b is longer than the length in the up-down direction of the fixing hole 61a. Note that the upper fixing hole 61b may be a circular hole having a larger diameter than the fixing hole 61a.

With reference to FIG. 5, the base portion 61 is placed such that the outside face in the vehicle width direction of the base portion 61 is in contact with the inside face in the vehicle width direction of the first fixing portion 32b and the inside face in the vehicle width direction of the second fixing portion 32c.

The first fastener 51 is inserted into the first fixing portion 32b and the fixing hole 61a from the outside in the vehicle width direction. The first nut 51a is fastened to the distal end portion of the first fastener 51 protruding inward in the vehicle width direction from the fixing hole 61a. The base portion 61 is fixed to the down frame 32 by being sandwiched between the first fixing portion 32b and the first nut 51a.

The second fastener 52 is inserted into the second fixing portion 32c and the upper fixing hole 61b from the outside in the vehicle width direction. The second nut 52a is fastened to the distal end portion of the second fastener 52 protruding inward in the vehicle width direction from the upper fixing hole 61b. The base portion 61 is fixed to the down frame 32 by being sandwiched between the second fixing portion 32c and the second nut 52a.

The engine support portion 62 has a plate shape extending rearward and downward from the base portion 61.

Specifically, the upper edge 62a of the engine support portion 62 is continuous with the upper edge of the base portion 61 and extends rearward and downward. The lower edge 62b of the engine support portion 62 is continuous with the lower edge of the base portion 61, extends rearward and downward, and is connected to the rear end of the upper edge 62a.

The rear end portion of the engine support portion 62 has an engine fixing hole 62c that is fastened to the cylinder block 24a by the engine fastener 50. The engine fixing hole 62c is a circular hole.

The engine support portion 62 is placed such that the rear end portion of the engine support portion 62 is in contact with the fixing hole portion 24d of the cylinder block 24a from the outside in the vehicle width direction. The engine support portion 62 is fixed to the cylinder block 24a by the engine fastener 50 being inserted in the engine fixing hole 62c from the outside in the vehicle width direction and fastened to the fixing hole portion 24d.

The radiator support portion 63 has a plate shape in an arm form extending forward and downward from a lower portion of the base portion 61.

The front end portion of the radiator support portion 63 has a radiator fixing hole 63a that is fixed to the radiator 37 by the radiator fastener 53.

The radiator fixing hole 63a is a slotted hole elongated in a front-rear direction. The radiator fixing hole 63a is inclined to the front in vehicle side view and elongated forward and upward.

The radiator support portion 63 has a lightening hole 63b to reduce the weight of the radiator support portion 63. The lightening hole 63b is positioned between the base portion 61 and the radiator fixing hole 63a. Note that a component of the saddle-ride vehicle 10 may be fixed to the lightening hole 63b.

With reference to FIG. 3, the radiator support portion 63 is placed such that the front end portion of the radiator support portion 63 is in contact with the lower attachment portion 37c from the inside in the vehicle width direction. Note that the front end portion of the radiator support portion 63 is in contact with the lower attachment portion 37c via the anti-vibration member 37d.

The radiator fastener 53 is inserted into the anti-vibration member 37d, the lower attachment portion 37c, and the radiator fixing hole 63a from the outside in the vehicle width direction. The nut 53a is fastened to the distal end of the radiator fastener 53 protruding inward in the vehicle width direction from the radiator fixing hole 63a. The radiator support portion 63 is fixed to the radiator 37 by being sandwiched between the nut 53a and the lower attachment portion 37c provided with the anti-vibration member 37d.

With reference to FIG. 6, the shaft portion of the first fastener 51 is fitted in the fixing hole 61a of the base portion 61. The play P2 (second play) between the fixing hole 61a of the base portion 61 and the shaft portion of the first fastener 51 is set to be small. Thus, when the engine hanger 60 is being attached, the engine hanger 60 can be rotated with high accuracy with the shaft portion of the first fastener 51 as its rotation center.

The outer diameter of the shaft portion of the second fastener 52 is the same as that of the shaft portion of the first fastener 51. Since the upper fixing hole 61b into which the second fastener 52 is inserted is a slotted hole, the play P4 (fourth play) between the upper fixing hole 61b and the shaft portion of the second fastener 52 is larger than the play P2. Thus, when the engine hanger 60 is being attached, the engine hanger 60 can be rotated with the shaft portion of the first fastener 51 as its rotation center. Because the play P4 is larger than the play P2, it absorbs assembling errors. Thus, after the fixing hole 61a is positioned with high accuracy by the first fastener 51, the second fastener 52 can be inserted easily into the upper fixing hole 61b.

The play P1 (first play) between the engine fixing hole 62c and the shaft portion of the engine fastener 50 is larger than the play P2. It absorbs assembling errors, and the engine fastener 50 can be inserted easily into the engine fixing hole 62c.

The play P3 (third play) between the radiator fixing hole 63a and the shaft portion of the radiator fastener 53 is larger than the play P2. It absorbs assembling errors, and the radiator fastener 53 can be inserted easily into the radiator fixing hole 63a.

The distance L1 between the fixing hole 61a and the radiator fixing hole 63a is larger than the distance L2 between the fixing hole 61a and the engine fixing hole 62c. The radiator 37 is lighter than the power unit 12.

Here, an example of attachment procedure using the engine hanger 60 will be described.

In a stage prior to attachment of the engine hanger 60, the power unit 12 is fixed or temporarily attached to the front frame 19. The radiator 37 is fixed or temporarily attached to the front frame 19 via the upper radiator fastener 47.

First, the base portion 61 of the engine hanger 60 is attached to the lower end portion 32a of the down frame 32 by the first fastener 51 and the second fastener 52. In this state, fastening of the first fastener 51 and the second fastener 52 is temporary; they are not completely fastened.

Next, the engine support portion 62 is fastened to the fixing hole portion 24d of the cylinder block 24a by the engine fastener 50. In this process, the operator or the like rotates the engine hanger 60 around the shaft portion of the first fastener 51 to make a fine adjustment to the position of the engine fixing hole 62c relative to the fixing hole portion 24d and then fastens the engine fastener 50. Thus, the engine support portion 62 can be easily fixed to the cylinder block 24a by the engine fastener 50. In this state, fastening of the engine fastener 50 is temporary; it is not completely fastened.

Next, the radiator support portion 63 is fastened to the lower attachment portion 37c of the radiator 37 by the radiator fastener 53.

In this process, the operator or the like rotates the engine hanger 60 around the shaft portion of the first fastener 51 to make a fine adjustment to the alignment of the lower attachment portion 37c and the radiator fixing hole 63a and fastens the radiator fastener 53.

The radiator 37 is swingable around the upper radiator fastener 47 in vehicle side view. The radiator fixing hole 63a is formed to be a slotted hole elongated in a front-rear direction along the swing path of the lower attachment portion 37c at the time when the radiator 37 is swung. With this configuration, the alignment of the lower attachment portion 37c and the radiator fixing hole 63a is easy, and the radiator fastener 53 can be easily fastened. In this stage, fastening of the radiator fastener 53 is temporary; it is not completely fastened.

After that, the first fastener 51, the second fastener 52, the engine fastener 50, and the radiator fastener 53 are completely fastened. This complete fastening is made in the order of the first fastener 51, the second fastener 52, the engine fastener 50, and the radiator fastener 53, and thus, the radiator fastener 53 is completely fastened in the end. With this process, the cylinder block 24a and the radiator 37 are fixed to the down frame 32 via the engine hanger 60.

As has been described above, in an embodiment to which the present invention is applied, the saddle-ride vehicle 10 includes the main frames 31 extending rearward from the head pipe 18, the down frames 32 extending downward from the head pipe 18, and the power unit 12 and the radiator 37 supported by the down frames 32. The engine hangers 60 that support the power unit 12 are attached to the down frames 32. The engine hanger 60 integrally includes the radiator support portion 63 that supports the radiator 37.

Since with this configuration, the engine hangers 60 that are attached to the down frames 32 integrally include the radiator support portions 63 that support the radiator 37, it is possible to support the power unit 12 and the radiator 37 with the engine hangers 60. This configuration makes it possible to fix the power unit 12 and the radiator 37 to the down frames 32 with a simple structure having fewer parts.

The power unit 12 is located on the rear side of the down frames 32, and the radiator 37 is located on the front side of the down frames 32. The engine hangers 60 are connected to the power unit 12 on the rear side of the down frames 32, and the radiator support portions 63 are connected to the radiator 37 on the front side of the down frames 32.

This configuration makes it possible to effectively utilize spaces on the front and rear sides of the down frames 32 to support the radiator 37 and the power unit 12.

The engine hangers 60 are separate parts from the down frames 32 and fixed to the down frames 32 with the first fasteners 51 and the second fasteners 52. The engine hanger 60 includes the base portion 61 that is fixed to the down frame 32 by the first fastener 51 and the second fastener 52, the engine support portion 62 that extends rearward from the base portion 61 and is connected to the power unit 12, and the radiator support portion 63 that extends forward from the base portion 61 and is connected to the radiator 37.

Since with this configuration, the engine hangers 60 are separate parts from the down frames 32, the engine hangers 60 can be fixed to the down frames 32 after the power unit 12 is placed in the vehicle body. This makes it easy to attach the engine hangers 60 to the power unit 12. In addition, since the engine support portion 62 and the radiator support portion 63 are located dividedly on the front and rear sides of the base portion 61, it is possible to prevent concentration of loads on the engine hangers 60 in the rotation direction with the first fasteners 51 and the second fasteners 52 as fulcrums.

The base portion 61 includes the fixing hole 61a that is fastened to the down frame 32 by the first fastener 51 and the upper fixing hole 61b that is located above the fixing hole 61a and fastened to the down frame 32 by the second fastener 52, and the upper fixing hole 61b has a larger diameter than the fixing hole 61a or has a slotted hole. The engine support portion 62 includes the engine fixing hole 62c that is fastened to the power unit 12 by the engine fastener 50, and the play P1 is provided between the engine fastener 50 and the engine fixing hole 62c. The radiator support portion 63 includes the radiator fixing hole 63a that is fastened to the radiator 37 by the radiator fastener 53, and the radiator fixing hole 63a is a slotted hole.

With this configuration, it is easy in the attachment process to make a fine adjustment to the position of the engine hanger 60 by rotating the engine hanger 60 around the first fastener 51 fastened to the fixing hole 61a of the base portion 61. After the attachment, the second fastener 52 fastened to the upper fixing hole 61b of the base portion 61 restricts the rotation of the engine hanger 60 effectively. Since the play P1 is provided between the engine fastener 50 and the engine fixing hole 62c, assembling errors can be absorbed by the play P1, and the engine support portion 62 can be fastened easily to the power unit 12. Further, since the radiator fixing hole 63a is a slotted hole, assembling errors can be absorbed by the slotted hole, and the radiator support portion 63 can be fastened easily to the radiator 37.

Further, the play P1 is set to be larger than the play P2 between the fixing hole 61a and the first fastener 51 that is fastened to the fixing hole 61a, and the play P3 between the radiator fastener 53 and the radiator fixing hole 63a is set to be larger than the play P2.

Since with this configuration, the play P1 between the engine fastener 50 and the engine fixing hole 62c is larger than the play P2, assembling errors can be absorbed by the play P1, and the engine support portion 62 can be fastened easily to the power unit 12. Further, the play P3 between the radiator fastener 53 and the radiator fixing hole 63a is larger than the play P2, assembling errors can be absorbed by the play P3, and the radiator support portion 63 can be fastened easily to the radiator 37.

In addition, the radiator 37 is fastened to the vehicle body by the upper radiator fasteners 47 provided above the radiator fasteners 53, and the radiator fixing hole 63a is a slotted hole elongated in the swing direction of the radiator 37 when the radiator 37 is swung around the upper radiator fastener 47 in vehicle side view.

Since with this configuration, the radiator fixing hole 63a is a slotted hole elongated in the swing direction of the radiator 37, it is possible to align the radiator 37 and the radiator fixing hole 63a easily. Thus, the radiator support portion 63 can be fastened easily to the radiator 37 by the radiator fastener 53.

The radiator support portion 63 has the lightening hole 63b.

With this configuration, it is possible to reduce the weight of the engine hanger 60.

The engine hanger 60 is attached to the lower end portion 32a of the down frame 32.

With this configuration, the engine hanger 60 can support lower portions of the power unit 12 and the radiator 37.

Figure 7:
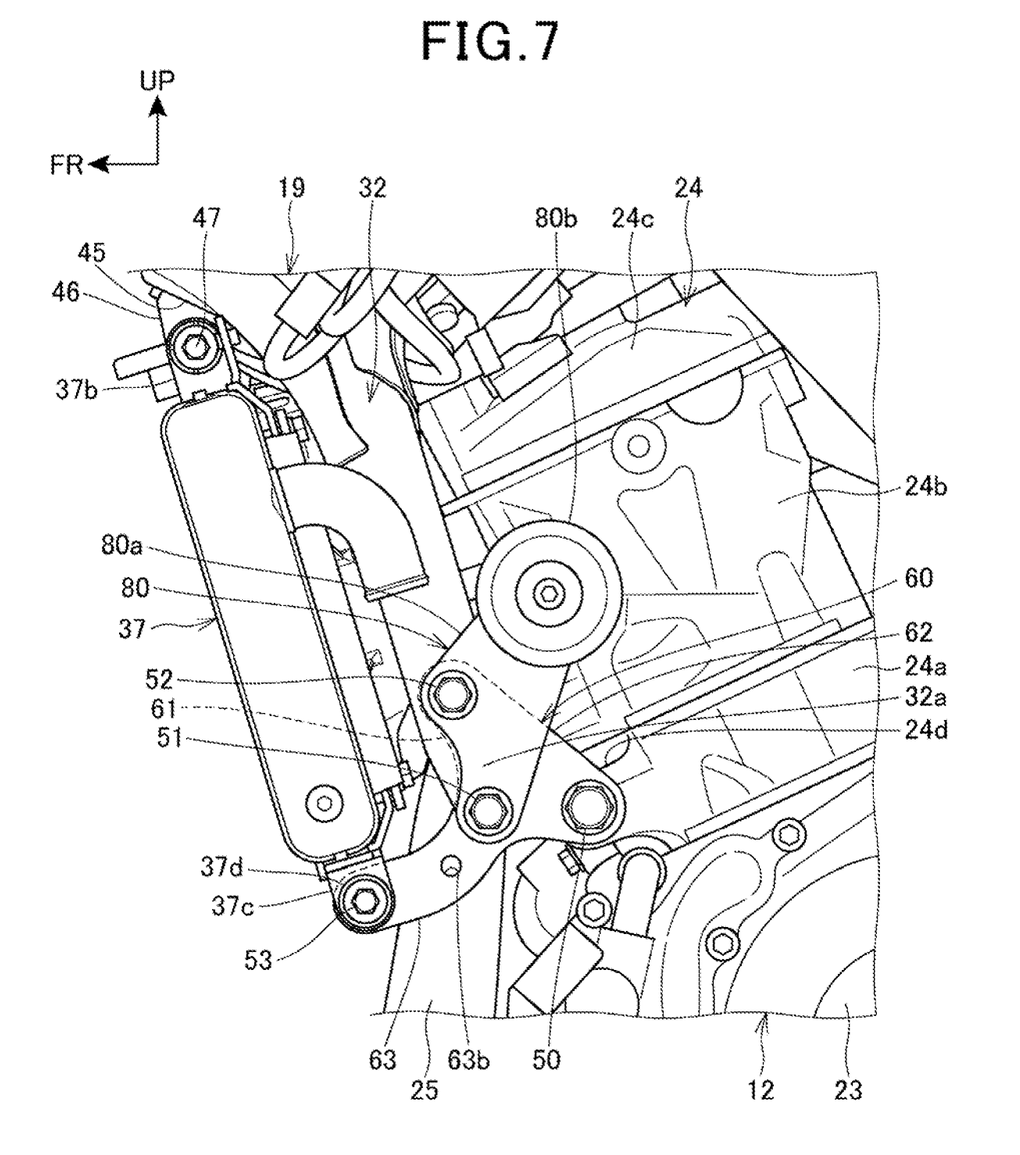
FIG. 7 is a left side view of a modification example of the embodiment.

FIG. 7 is a left side view of a modification example of the embodiment.

In the modification example, a vehicle-body protection member 80 for protecting the vehicle body is attached to the lower end portion 32a of the down frame 32. The vehicle-body protection member 80 is attached to the outside in the vehicle width direction of the engine hanger 60.

The vehicle-body protection member 80 includes an attachment plate 80a that is fastened to the lower end portion 32a and a slider 80b provided on the outside face of the attachment plate 80a. The slider 80b is formed of, for example, a resin.

The attachment plate 80a is placed on the outside face of the first fixing portion 32b and on the outside face of the second fixing portion 32c, and the attachment plate 80a is fastened to the first fixing portion 32b and the second fixing portion 32c by the first fastener 51 and the second fastener 52.

The attachment plate 80a extends rearward from the lower end portion 32a. The slider 80b protrudes outward in the vehicle width direction from the rear end portion of the attachment plate 80a. With this configuration, the vehicle-body protection member 80 can be fixed to the down frame 32 by utilizing the first fastener 51 and the second fastener 52.

Note that the above embodiment is for describing an aspect to which the present invention is applied, and thus, the present invention is not limited to the above embodiment.

Although the above embodiment is described on the assumption that the down frames 32 extend downward from the head pipe 18, the configuration is not limited to this example, but, for example, the down frames 32 may extend downward from the front end portions of the main frames 31.

Although in the above embodiment, the radiator fixing hole 63a is a slotted hole elongated in the swing direction of the radiator 37, the present invention is not limited to this configuration. For example, the radiator fixing hole 63a may be a slotted hole formed in an arc shape in vehicle side view so as to be along the swing direction of the radiator 37.

Although the above embodiment has been described based on an example in which the saddle-ride vehicle 10 is a two-wheeled motorcycle, the present invention is not limited to this example, but the present invention is applicable to a three-wheeled saddle-ride vehicle with two front wheels or two rear wheels and a saddle-ride vehicle with four or more wheels.

Configurations Supported by Embodiment Described Above

The above embodiment supports the following configurations.

(Configuration 1) A saddle-ride vehicle including: a head pipe; a frame extending rearward from the head pipe; a down frame extending downward from the head pipe or a front end portion of the frame; an engine and a radiator supported by the down frame; and an engine hanger that is attached to the down frame and supports the engine, in which the engine hanger integrally includes a radiator support portion that supports the radiator.

Since with this configuration, the engine hanger that is attached to the down frame integrally includes the radiator support portion that supports the radiator, it is possible to support the engine and the radiator with the engine hanger. This configuration makes it possible to fix the engine and the radiator to the down frame with a simple structure having fewer parts.

(Configuration 2) The saddle-ride vehicle according to Configuration 1, in which the engine is located on a rear side of the down frame, and the radiator is located on a front side of the down frame, and the engine hanger is connected to the engine on the rear side of the down frame, and the radiator support portion is connected to the radiator on the front side of the down frame.

This configuration makes it possible to effectively utilize spaces on the front and rear sides of the down frame to support the radiator and the engine.

(Configuration 3) The saddle-ride vehicle according to Configuration 2, in which the engine hanger is a separate part from the down frame and is fixed to the down frame by a fastener, and the engine hanger includes a base portion fixed to the down frame by the fastener, an engine support portion that extends rearward from the base portion and is connected to the engine, and the radiator support portion that extends forward from the base portion and is connected to the radiator.

Since with this configuration, the engine hanger is a separate part from the down frame, the engine hanger can be fixed to the down frame after the engine is placed in the vehicle body. This makes it easy to attach the engine hanger to the engine. In addition, since the engine support portion and the radiator support portion are located dividedly on the front and rear sides of the base portion, it is possible to prevent concentration of a load on the engine hanger in the rotation direction with the fastener as a fulcrum.

(Configuration 4) The saddle-ride vehicle according to Configuration 3, in which the fastener includes a plurality of fasteners, the base portion includes a fixing hole that is fastened to the down frame by the fastener and an upper fixing hole that is located above the fixing hole and fastened to the down frame by another one of the fasteners, and the upper fixing hole has a larger diameter than the fixing hole or has a slotted hole, the engine support portion includes an engine fixing hole that is fastened to the engine by an engine fastener, and first play is provided between the engine fastener and the engine fixing hole, and the radiator support portion includes a radiator fixing hole that is fastened to the radiator by a radiator fastener, and the radiator fixing hole is a slotted hole.

With this configuration, it is easy in the attachment process to make a fine adjustment to the position of the engine hanger by rotating the engine hanger around the fastener fastened to the fixing hole of the base portion. After the attachment, the fastener fastened to the upper fixing hole of the base portion restricts the rotation of the engine hanger effectively. Since the first play is provided between the engine fastener and the engine fixing hole, assembling errors can be absorbed by the first play, and the engine support portion can be fastened easily to the engine. Further, since the radiator fixing hole is a slotted hole, assembling errors can be absorbed by the slotted hole, and the radiator support portion can be fastened easily to the radiator.

(Configuration 5) The saddle-ride vehicle according to Configuration 4, in which the first play is set to be larger than second play between the fixing hole and the fastener that is fastened to the fixing hole, and third play between the radiator fastener and the radiator fixing hole is set to be larger than the second play.

Since with this configuration, the first play between the engine fastener and the engine fixing hole is larger than the second play, assembling errors can be absorbed by the first play, and the engine support portion can be fastened easily to the engine. Further, the third play between the radiator fastener and the radiator fixing hole is larger than the second play, assembling errors can be absorbed by the third play, and the radiator support portion can be fastened easily to the radiator.

(Configuration 6) The saddle-ride vehicle according to Configuration 4 or 5, in which the radiator is fastened to a vehicle body by an upper radiator fastener provided above the radiator fastener, and the radiator fixing hole is a slotted hole elongated in a swing direction of the radiator when the radiator is swung around the upper radiator fastener in vehicle side view.

Since with this configuration, the radiator fixing hole is a slotted hole elongated in the swing direction of the radiator, it is possible to align the radiator and the radiator fixing hole easily. Thus, the radiator support portion can be fastened easily to the radiator by the radiator fastener.

(Configuration 7) The saddle-ride vehicle according to any one of Configurations 3 to 6, in which the radiator support portion has a lightening hole.

With this configuration, it is possible to reduce the weight of the engine hanger.

(Configuration 8) The saddle-ride vehicle according to any one of Configurations 1 to 7, in which the engine hanger is attached to a lower end portion of the down frame.

With this configuration, the engine hanger can support lower portions of the engine and the radiator.

REFERENCE SIGNS LIST

10 saddle-ride vehicle
12 power unit (engine)
18 head pipe
31 main frame (frame)
32 down frame
32$a$ lower end portion
37 radiator
47 upper radiator fastener
50 engine fastener
51 first fastener (fastener, fastener that is fastened to a fixing hole)
52 second fastener (fastener)
53 radiator fastener
60 engine hanger
61 base portion
61$a$ fixing hole
61$b$ upper fixing hole
62 engine support portion
62$c$ engine fixing hole
63 radiator support portion
63$a$ radiator fixing hole
63$b$ lightening hole
P1 play (first play)
P2 play (second play)
P3 play (third play)

What is claimed is:
1. A saddle-ride vehicle 4comprising:
a head pipe;
a frame extending rearward from the head pipe;
a down frame extending downward from the head pipe or a front end portion of the frame;
an engine and a radiator supported by the down frame; and
an engine hanger that is provided to the down frame and supports the engine, wherein
the engine hanger integrally includes a radiator support portion that supports the radiator,
the engine is located on a rear side of the down frame, and the radiator is located on a front side of the down frame, the engine hanger is connected to the engine on the rear side of the down frame, and the radiator support portion is connected to the radiator on the front side of the down frame, the engine hanger is a separate part from the down frame and is fixed to the down frame by a fastener, the engine hanger includes a base portion fixed to the down frame by the fastener, an engine support portion that extends rearward from the base portion and is connected to the engine, and the radiator support portion that extends forward from the base portion and is connected to the radiator, the fastener includes a plurality of fasteners, the base portion includes a fixing hole that is fastened to the down frame by the fastener and an upper fixing hole that is located above the fixing hole and fastened to the down frame by another one of the fasteners, and the upper fixing hole has a larger diameter than the fixing hole or has a slotted hole, the engine support portion includes an engine fixing hole that is fastened to the engine by an engine fastener, and first play is provided between the engine fastener and the engine fixing hole, the radiator support portion includes a radiator fixing hole that is fastened to the radiator by a radiator fastener, and the radiator fixing hole is a slotted hole, the first play is set to be larger than second play between the fixing hole and the fastener that is fastened to the fixing hole, and third play between the radiator fastener and the radiator fixing hole is set to be larger than the second play.

2. The saddle-ride vehicle according to claim 1, wherein the radiator is fastened to a vehicle body by an upper radiator fastener provided above the radiator fastener, and the radiator fixing hole is a slotted hole elongated in a swing direction of the radiator when the radiator is swung around the upper radiator fastener in vehicle side view.

3. The saddle-ride vehicle according to claim 1, wherein the radiator support portion has a lightening hole.

4. The saddle-ride vehicle according to claim 1, wherein the engine hanger is attached to a lower end portion of the down frame.

\* \* \* \* \*